(12) United States Patent
Seo

(10) Patent No.: US 8,270,044 B2
(45) Date of Patent: Sep. 18, 2012

(54) SCANNING APPARATUS HAVING IMAGE CORRECTION FUNCTION

(75) Inventor: Hyeon-seok Seo, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 897 days.

(21) Appl. No.: 11/766,961

(22) Filed: Jun. 22, 2007

(65) Prior Publication Data

US 2008/0100884 A1   May 1, 2008

(30) Foreign Application Priority Data

Oct. 26, 2006 (KR) .................. 10-2006-0104700

(51) Int. Cl.
*H04N 1/04* (2006.01)

(52) U.S. Cl. ........ 358/488; 358/474; 358/497; 358/494; 358/525; 358/463; 382/291; 382/285; 382/300; 382/318; 356/602; 356/603; 356/604

(58) Field of Classification Search ............ 358/488
See application file for complete search history.

(56) References Cited

U.S. PATENT DOCUMENTS

| | | | |
|---|---|---|---|
| 5,940,544 A | 8/1999 | Nako | |
| 6,330,050 B1 | 12/2001 | Takahashi et al. | |
| 6,816,624 B1 | 11/2004 | Ebisawa et al. | |
| 7,430,065 B2 | 9/2008 | Arakai et al. | |
| 2001/0015821 A1 | 8/2001 | Namizuka et al. | |
| 2002/0028027 A1* | 3/2002 | Koyama | 382/289 |
| 2002/0110380 A1* | 8/2002 | McIntyre | 399/15 |
| 2004/0042678 A1 | 3/2004 | Loce et al. | |
| 2004/0052430 A1* | 3/2004 | Albertelli et al. | 382/289 |
| 2004/0201870 A1 | 10/2004 | Araki | |
| 2005/0280849 A1* | 12/2005 | Kojima et al. | 358/1.9 |
| 2006/0065858 A1* | 3/2006 | Spears et al. | 250/559.29 |
| 2006/0119906 A1 | 6/2006 | Park | |
| 2006/0193533 A1 | 8/2006 | Araki et al. | |
| 2008/0137987 A1 | 6/2008 | Kojima et al. | |
| 2008/0250470 A1 | 10/2008 | Bruls et al. | |

FOREIGN PATENT DOCUMENTS

| | | |
|---|---|---|
| EP | 1032191 | 8/2000 |
| EP | 1093084 | 4/2001 |
| EP | 1193647 | 4/2002 |
| JP | 11041455 | 2/1999 |

(Continued)

OTHER PUBLICATIONS

European Search Report issued Oct. 16, 2009 in EP Application No. 07118231.5.

(Continued)

*Primary Examiner* — Twyler Haskins
*Assistant Examiner* — Brendan McCommas
(74) *Attorney, Agent, or Firm* — Stanzione & Kim, LLP

(57) ABSTRACT

A scanning apparatus includes a scanning head that scans an image of a document positioned on a stage glass, but varying in its distance therefrom. A boundary line is detected to determine an amount of skew therein. A skew line is compared with an established reference line, and a correction factor is calculated based on the result of the comparison. The original image processed to map the boundary line to the reference line and image data inside of the boundary line is similarly mapped based on the calculated correction factor. Beneficially, skews of an image produced when a thick book is scanned can be corrected simply.

34 Claims, 11 Drawing Sheets

FOREIGN PATENT DOCUMENTS

| | | |
|---|---|---|
| JP | 2004088499 | 3/2004 |
| JP | 2004-343667 | 12/2004 |
| JP | 2006-19893 | 1/2006 |
| KR | 2000-0008845 | 2/2000 |
| KR | 2005-110741 | 11/2005 |
| KR | 2006-62342 | 6/2006 |

OTHER PUBLICATIONS

EP Office Action issued Jun. 17, 2011 in EP Patent Application No. 07 118 231.5.

KR Office Action issued Aug. 31, 2011 in KR Patent Application No. 10-2007-0092810.

CN Office Action issued Jul. 7, 2010 in CN Patent Application No. 200710167553.6.

CN Office Action issued Sep. 7, 2011 in CN Patent Application No. 200710167553.6.

Korean Office Action Issued on Apr. 27, 2012 in KR Patent Application No. 10-2007-0092810.

Chinese Office Action Issued on May 30, 2012 in CN Patent Application No. 200710167553.6.

* cited by examiner

SCANNING APPARATUS HAVING IMAGE CORRECTION FUNCTION

CROSS-REFERENCE TO RELATED APPLICATIONS

This application claims benefit of priority under 35 U.S.C. §119(a) from Korean Patent Application No. 2006-0104700, filed on Oct. 26, 2006 in the Korean Intellectual Property Office, the disclosure of which is incorporated herein in its entirety by reference.

BACKGROUND OF THE INVENTION

1. Field of the Invention

The present general inventive concept relates to an apparatus and method, and more particularly, to a scanning apparatus and method, to correct skewing distortion in an image.

2. Description of the Related Art

In general, a scanning apparatus is a device that scans a document to produce image data with predetermined resolution. Referring to FIGS. 1A and 1B, a general scanning apparatus 10 includes a stage glass 20 on which a document is placed and a scanning head 30 that scans the document while translating below the stage glass 20 from one end of the stage glass 20 to the other. The scanning head 30 includes a light source module 31 that irradiates the document with light and a photoelectric converting device 33 that detects light reflected by the document and converts the detected light into an image signal.

In the conventional scanning apparatus 10, when the scanning head 31 scans a thick book, a region near a folding line A of the book is positioned above the stage glass 20 by a gap d1 while a page region B of the book contacts the stage glass 20, as illustrated FIG. 1B. Accordingly, a focus distance between the light source module 31 and the photoelectric converting device 33 varies as the scanning head 30 moves from the page region B to the folding line A (I1≠I2). Due to such a focus distance difference occurring when the scanning head 30 moves, there arises a problem in that an image of the region near the folding line A has spatial distortion (or skew) or appears to be darker than the image in the page region B, as illustrated in FIG. 1C.

SUMMARY OF THE INVENTION

The present general inventive concept provides a scanning apparatus which corrects distortion (or skew) included in an image.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept can be achieved by providing a scanning apparatus comprising a stage glass on which a document is positioned, a scanning head that scans an image of the document while translating below the stage glass, an image processing part that processes image data produced by the scanning head, a boundary line detecting part that detects a boundary line of the image, and a controller that, if a skew line exists in the boundary line detected by the boundary line detecting part, compares the skew line with a predetermined reference line, calculates a correction factor based on a result of the comparison, and controls the image processing part to correct the skew line and image data inside of the boundary line based on the calculated correction factor.

The reference line may be determined based on a straight line segment on the boundary line.

The controller may calculate a distance between the document image and the stage glass image and may control the image processing part to map a coordinate of the skew line onto a coordinate of the reference line based on the correction factor.

The correction factor may have a plurality of values to specify respective distances between a first boundary line including the skew line and a corresponding second boundary line.

The scanning apparatus may further comprise an image forming part that outputs the image, wherein the controller controls the image forming part to output the image processed by the image processing part.

The foregoing and/or other aspects and utilities of the present general inventive concept can be also achieved by providing an image processing method of a scanning apparatus comprising a stage glass on which a document is loaded and a scanning head that scans an image of the document while translating below the stage glass, comprising detecting a boundary line of the image, calculating a coordinate value of the boundary line and detecting a skew line whose coordinate value is not calculated, comparing the skew line with a reference line indicated by a straight line in the boundary line and calculating a correction factor to map the skew line onto the reference line based on a result of the comparison, and correcting the image and the skew line based on the calculated correction factor.

The foregoing and/or other aspects and utilities of the present general inventive concept are also achieved by providing an image forming method, comprising providing image data including a completely resolvable region thereof and a varyingly resolvable region thereof, extrapolating a linear relationship in the image data of the completely resolvable region across the varyingly resolvable region, and mapping the image data in the varyingly resolvable region to be aligned in a corrected image by the linear relationship.

The foregoing and/or other aspects and utilities of the present general inventive concept are also achieved by providing a computer-readable medium having encoded thereon computer instructions that, when decoded and executed by a processor, performs receiving image data including a completely resolvable region thereof and a varyingly resolvable region thereof, extrapolating a linear relationship in the image data of the completely resolvable region across the varyingly resolvable region, and mapping the image data in the varyingly resolvable region to be aligned in a corrected image by the linear relationship.

The foregoing and/or other aspects and utilities of the present general inventive concept are also achieved by providing an image forming apparatus, comprising a scanning head having a predefined optical depth of field with respect to a scanning plane to obtain image data of a document at least partially coplanar with the scanning plane, a controller to control the scanning head to translate across the scanning plane to acquire an original image of the document, and an image processing part to relocate skewed image data in the original image acquired from a portion of the document at least partially removed from the scanning plane while within the depth of field to a new location in a corrected image, the new location aligning the skewed image data with corresponding focused data of the original image data acquired from the portion of the document coplanar with the scanning plane.

The foregoing and/or other aspects and utilities of the present general inventive concept are also achieved by providing an image processor comprising a storage part to store an original image of a document at least partially coplanar with a plane defining an optical depth of field, an image processing part to relocate skewed image data in the original image acquired from a portion of the document at least partially removed from the plane while within the depth of field to a new location in a corrected image, the new location aligning the skewed image data with corresponding focused data of the original image data acquired from the portion of the document coplanar with the scanning plane as determined by a location of a boundary of the focused data relative to a location of a boundary of the skewed data.

The foregoing and/or other aspects and utilities of the present general inventive concept are also achieved by providing an image forming apparatus, comprising a controller to receive a scanned document image, and a unit to determine a boundary and a folding line from the scanned document image, to determine a correction region of the scanned document image with respect to a center line and the folding line, and to correct a boundary line of the correction region of the scanned document image according to a distance of skew from a reference line and the folding line.

BRIEF DESCRIPTION OF THE DRAWINGS

The above and/or other aspects and utilities of the present general inventive concept will become apparent and more readily appreciated from the following description of the exemplary embodiments, taken in conjunction with the accompanying drawings, in which.

DETAILED DESCRIPTION OF THE PREFERRED EMBODIMENTS

Figure 1A:
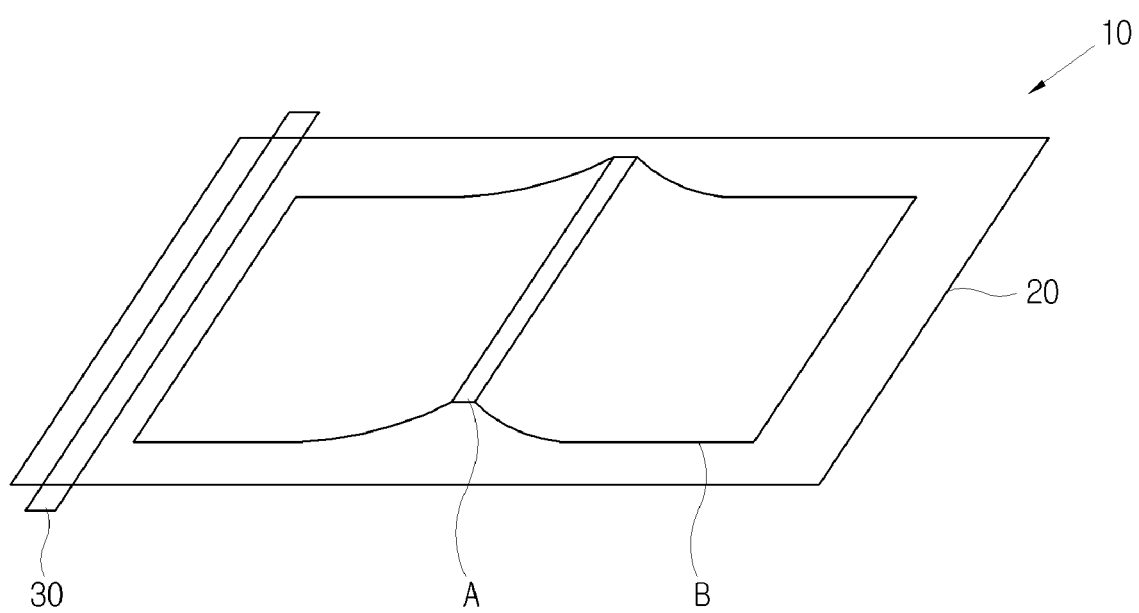
FIG. 1A is a perspective view of a general scanning apparatus.

Reference will now be made in detail to the exemplary embodiments of the present general inventive concept, examples of which are illustrated in the accompanying drawings, wherein like reference numerals refer to like elements throughout. The embodiments are described below so as to explain the present general inventive concept by referring to the figures.

Figure 2:
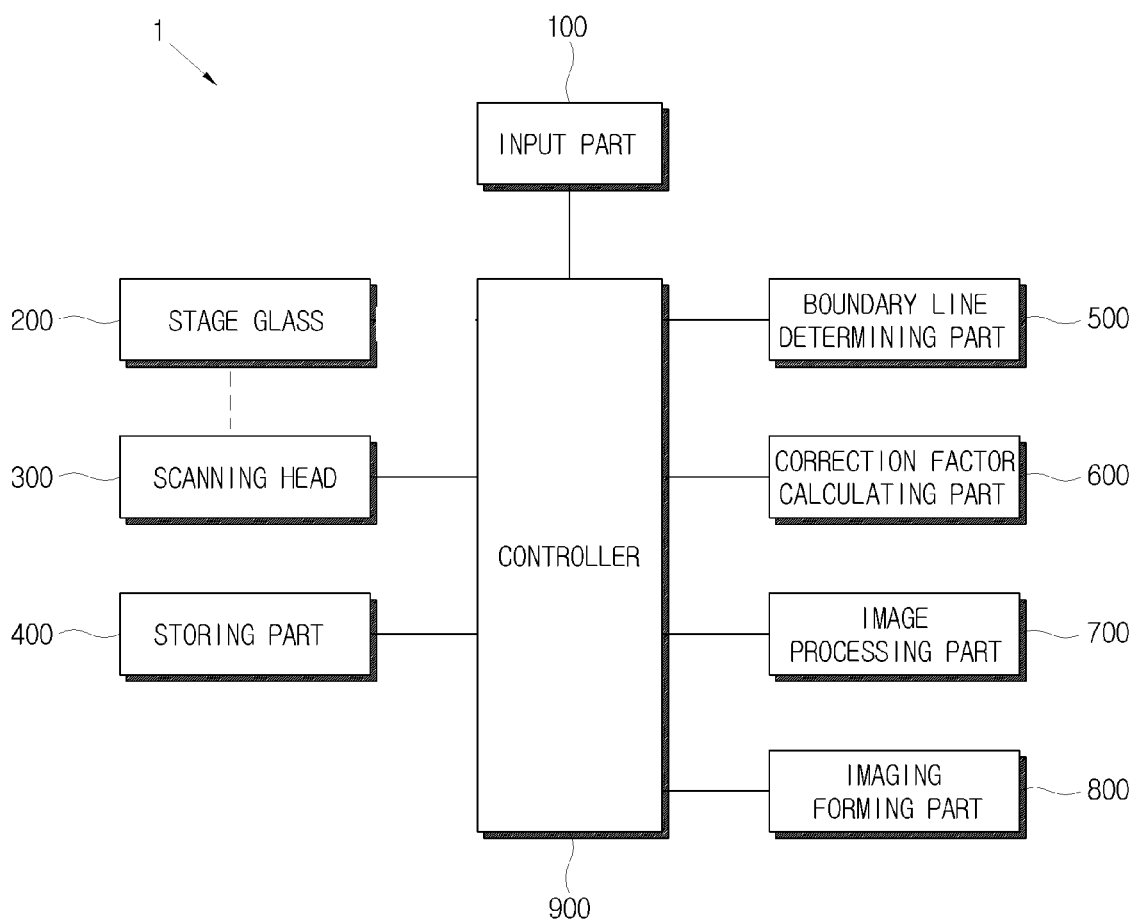
FIG. 2 is a block diagram of a scanning apparatus according to an exemplary embodiment of the general inventive concept.

FIG. 2 is a block diagram of a scanning apparatus 1 according to an exemplary embodiment of the general inventive concept. As illustrated in FIG. 2, the scanning apparatus 1 of the general inventive concept comprises an input part 100 to produce a signal indicative of a directive from a user, a stage glass 200 on which a document is placed, a scanning head 300 that scans the document while translating below the stage glass 200 between both end portions thereof, and a storing part 400 in which, among other things, an original document image produced by the scanning head 300 is stored. The scanning apparatus 1 may further comprise a boundary line determining part 500 that determines a boundary line between document and the stage glass in the produced original document image, a correction factor calculating part 600 that calculates a correction factor (CF) to correct a distorted region in the original document image, if the distorted region is present in the original document region, an image processing part 700 that corrects the distorted region of the image based on the calculated correction factor (CF), an image forming part 800 that renders the image corrected by the image processing part 700, and a controller 900 that controls the correction factor calculating part 600 and the image processing part 700 to calculate the correction factor (CF) and to correct the image of the distorted region, if the distorted region is detected in the original document image. The boundary line may be formed between the document and the stage glass 200, but other boundaries in the image may be used in conjunction with the present general inventive concept.

The exemplary system illustrated in FIG. 2 may be implemented in hardware, software, or a combination of both. For example, certain components, such as the boundary line determining part 500, the correction factor calculating part 600, and the image processing part 700, may be suited to be realized as processor instructions executing in one or more computer execution threads on one or more processors. Each of those functional components may be implemented on a dedicated processor, or may be executed on a single processor, such as a processor that implements the controller 900. Alternatively, each component illustrated in FIG. 2 may be realized in one or more application specific circuits. The present general inventive concept may be embodied through numerous configurations other than that illustrated in FIG. 2 without deviating from the spirit and intended scope thereof.

Further, it is to be understood that although the functional compartmentalization of FIG. 2 facilitates an understanding of the present general inventive concept through descriptions of the components of the illustrated exemplary embodiment, such configuration is not essential to practice the present general inventive concept. Elements other than those shown and described may be substituted therefor, functionality portrayed as carried out in multiple elements may be combined into a single component, and elements described as discrete may be distributed across multiple components. Indeed, numerous variations, alternatives and modifications will become apparent to the skilled artisan upon review of this disclosure and the present general inventive concept is intended to encompass such alternative configurations.

The exemplary input part 100 may receive a scanning signal from the user. The input part 100 may be provided with information on a region to be corrected and information on whether a region is to be corrected. The input part 100 may be implemented as a plurality of input panels by which various signals are generated responsive to user directives input thereon. A display part (not illustrated) that displays the original document image produced by the scanning head 300 may be provided on the input part 100. In certain embodiments of the present general inventive concept, the input part 100, when combined with the display part, may implement a graphical user interface (GUI).

Figure 1B:
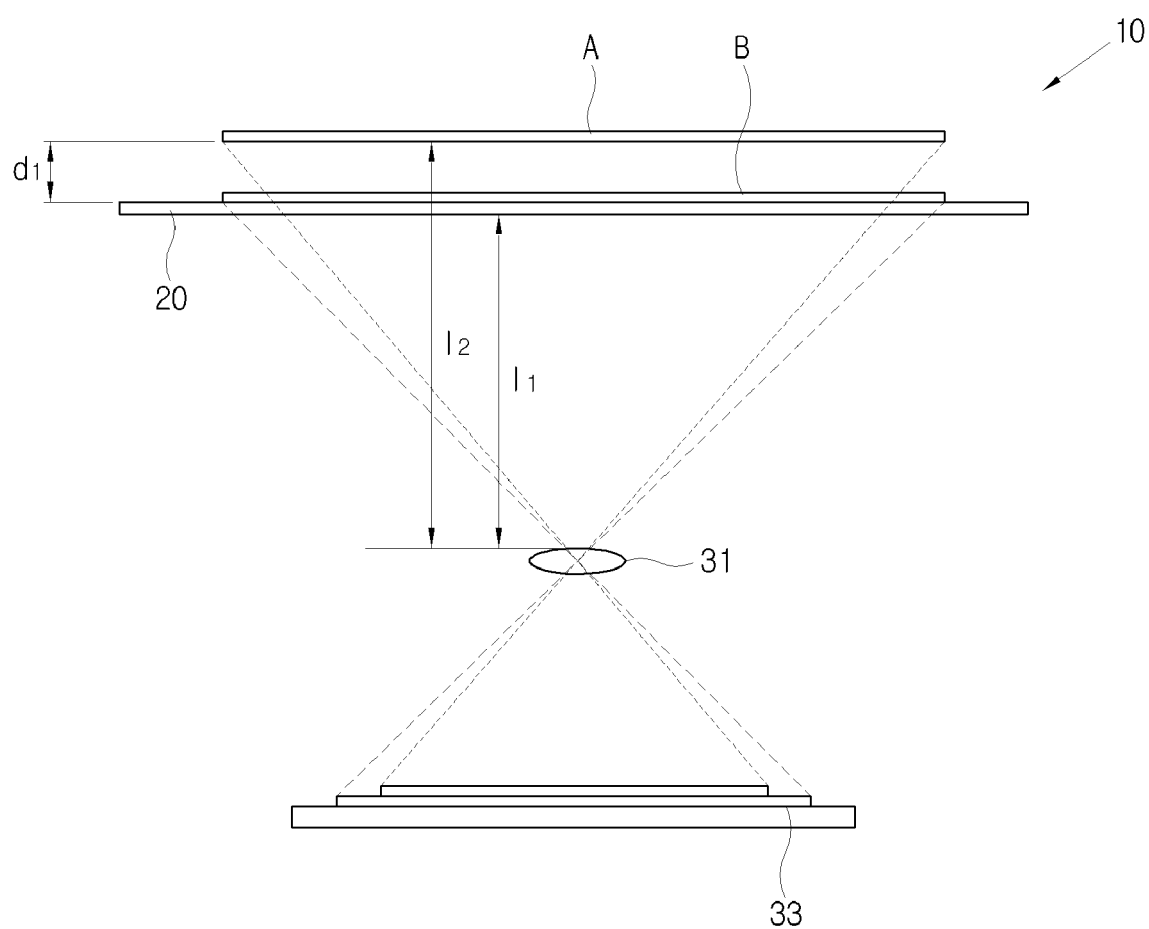
FIG. 1B is a diagram illustrating a focus distance difference in the general scanning apparatus.
Figure 1C:
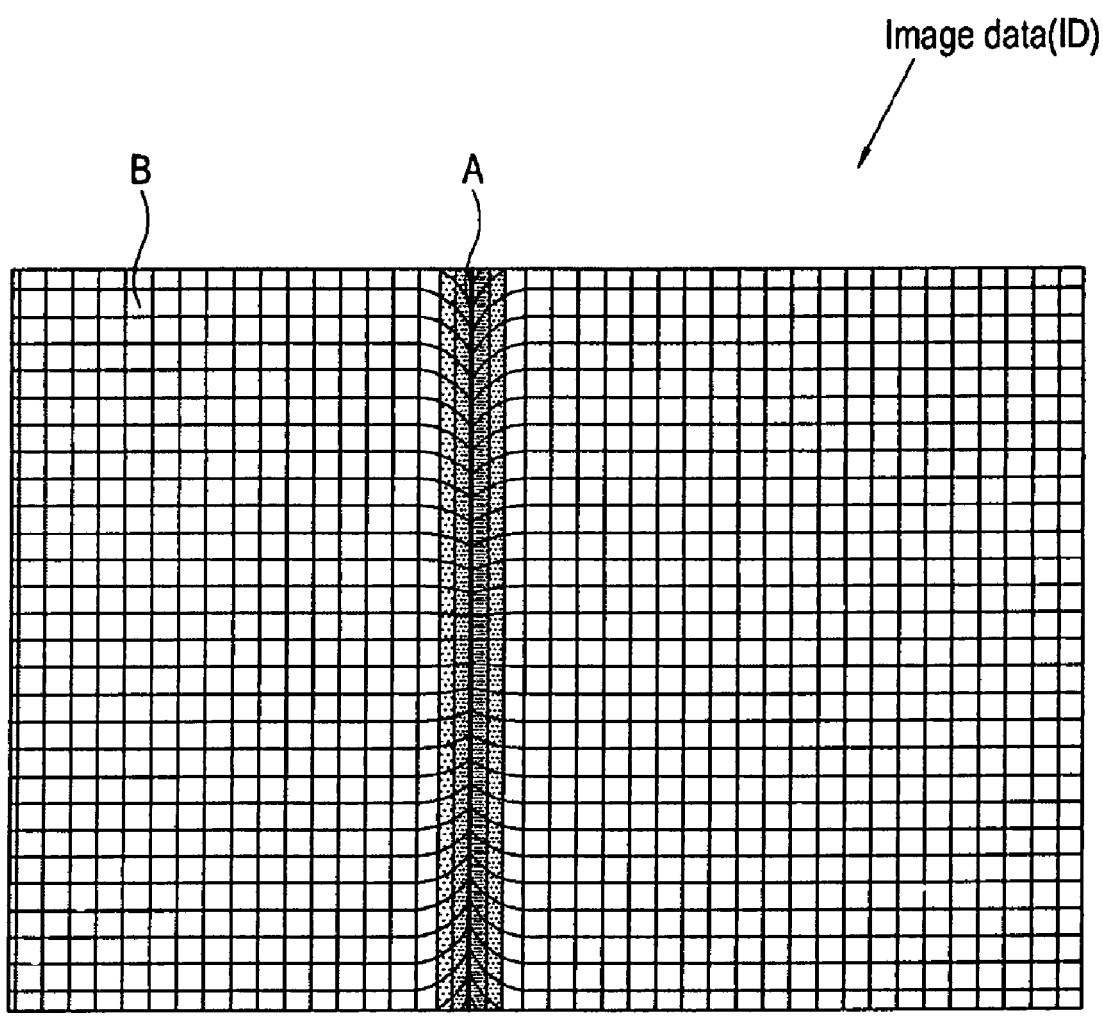
FIG. 1C is an illustration of a distorted image formed by the general scanning apparatus.

The present general inventive concept is not limited by the type or construction of the scanning mechanism. The description below will refer to elements of FIG. 1A-1B to illustrate exemplary embodiments of those portions of a conventional scanning mechanism that may be used in conjunction with the present general inventive concept. It is to be understood that such reference to conventional elements are made for purposes of description, and not limitation.

It is to be made clear also that the conventional scanning mechanism, when used in embodiments of the present general inventive concept, is typically limited by its optics to a "depth of field," which refers herein to the distance from the stage glass 200 up to which resolvable imagery can be obtained by the sensor. Any object placed on the stage glass 200 that is beyond the depth of field is "irresolvable" by the sensor, and will typically appear as a field of a foreign color, such as black. The imagery within the depth of field, but not in contact with the stage glass, referred to herein as the folding line (FL) region, will be "varyingly resolvable", and will often be skewed with respect to the image data obtained from a document in contact with the stage glass 200. The imagery from portions of the document in contact with the staging glass 200 will be referred to herein as "completely resolvable."

The stage glass 200 on which the document is placed may be made of transparent glass material through which light from a light source module 31 passes. The stage glass 200 may have the same structure and composition as conventional stage glasses, and therefore, detailed explanation thereof will be omitted for the sake of brevity.

The exemplary scanning head 300 comprises the light source module 31 that irradiates the document positioned on the stage glass 200 with light, a photoelectric converting part 33 that receives light reflected by the document and converts the received light into an image signal, and an analog/digital converting part (not illustrated) that converts the image signal into digital image data. For purposes of description and not limitation, the scanning head 300 scans the document along a Y axis (see FIG. 4A) of the stage glass 200. The scanning head 300 may be translated by means of a driving part (not illustrated) according to a control signal from the controller 900. The driving part (not illustrated) may have the same structure as those of conventional scanning heads, such as those generally embodied by a stepping motor, and may move the scanning head 300 by means of a belt-pulley assembly, a rack-pinion assembly, etc.

The light source module 31 and the photoelectric converting part 33 may be constructed into linear formation, such as by a light bar and a linear sensor array. When so embodied, image data are produced as a plurality of scan lines of the document. The scan lines are generated in a sequential order and include data points, such as pixel data, that may be sequentially ordered within each scan line. Thus, a coordinate system in the image may be defined by scan lines in the "Y" direction and pixels in the "X" direction. Beneficially, such a coordinate system allows identification of data during the scanning operation and prior to the completion thereof.

The exemplary storing part 400 stores the original document image data produced by the scanning head 300 and corrected image data corrected by the image processing part 700. In this exemplary embodiment, the storing part 400 is provided to store each scan line corresponding to each line produced by the photoelectric converting part 33 and sequentially stores image data produced in each line, as described above. For example, image data corresponding to a first scan line from the photoelectric converting part 33 may be stored in a corresponding area of the storing part 400. Accordingly, the image data partially acquired at a first scan line of the document are stored in the storing part 400 in a manner where coordinate values of locations on the document may be obtained.

Storing part 400 may store not only image data, as indicated above, but may also provide storage for processing instructions that, when executed by a processor, perform operations, such as those described below. As such, the storing part 400 may be a combination of persistent storage, such as by read-only memory (ROM), flash memory, magnetic or optical storage devices, and others, and volatile memory, such as random-access memory (RAM), and others. It is to be understood, also, that although the storing part 400 is illustrated as a discrete element in FIG. 2, the storing part 400 may be distributed among multiple devices, including as an element in the other components illustrated. For purposes of description, and not limitation, storing part 400 will be discussed below as if it were a discrete element, and, as used herein, the term "storing part 400," or, alternatively "memory 400," is intended to refer to the combined storage capability of the scanning apparatus 1, to include temporal storage, such as by pipelining and delay lines.

It is to be understood that in the descriptions that follow, various "lines" will be discussed as if such lines were physically drawn on the image. However, such description is for purposes of explaining certain underlying concepts of the present general inventive concept and physically rendering the lines so that they can be viewed is not essential to practice the present general inventive concept. Certain embodiments may allow a user to view, and even modify the lines described below, but even then, the lines are abstracted to be compatible to manipulation by components of the apparatus embodying the present general inventive concept. For example, the lines may be represented through data structures maintained in the storing part 400 that contain information on interconnected nodes forming endpoints of line segments. The present general inventive concept is not limited by the implementation details of manipulating line data and the storage of that data and description thereof will be omitted in the interest of brevity.

Figure 3:
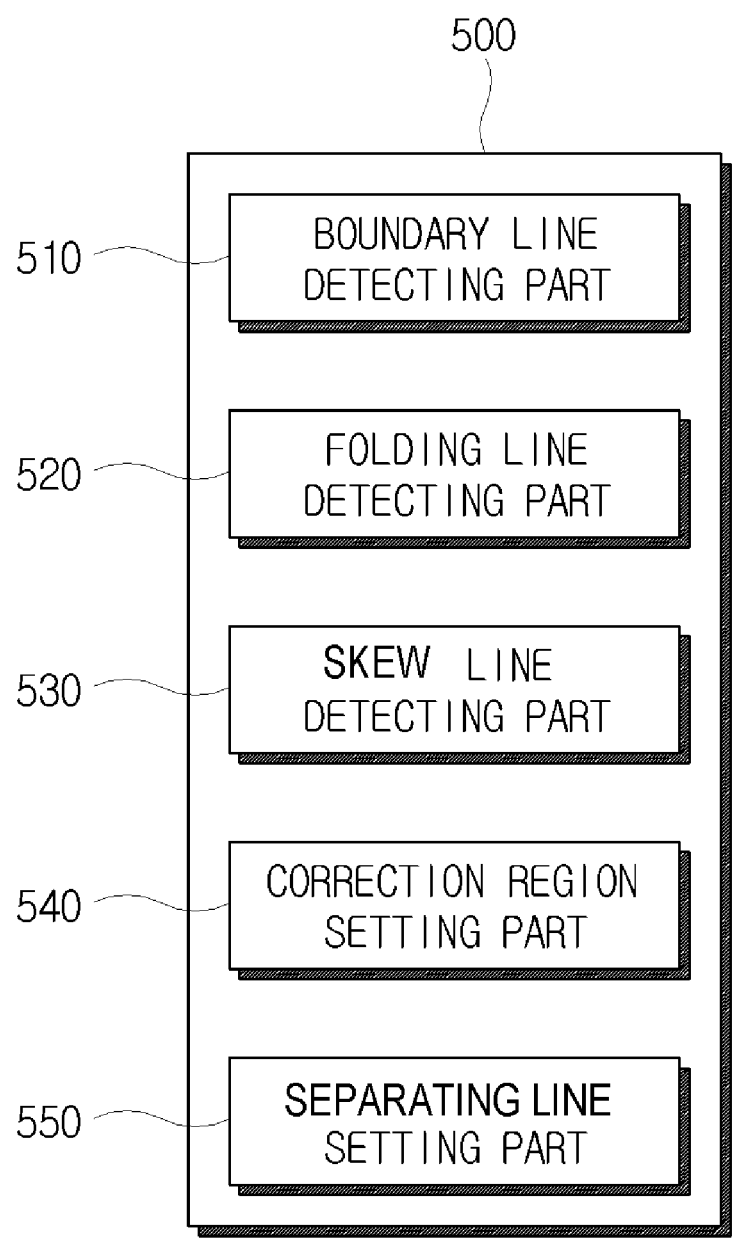
FIG. 3 is a block diagram illustrating a detailed configuration of a boundary line determining part of FIG. 2.

The exemplary boundary line determining part 500 determines a boundary line (BL) in the original image data stored in the storing part 400. As illustrated in FIG. 3, the boundary line determining part 500 may include a boundary line detecting part 510 that detects a boundary line (BL) of an image, a folding line detecting part 520 that detects a folding line (FL) of the image based on the boundary line (BL) detected by the boundary line detecting part 510, a skew line detecting part 530 that detects a skew line (SL) occurring in the boundary line (BL), a correction region setting part 540 that determines a correction region including the skew line (SL), and a separating line setting part 550 that determines a separating line (SL) indicating a boundary of the image in the correction region. The full definitions of the lines briefly mentioned above are given in the paragraphs that follow.

Figure 4A:
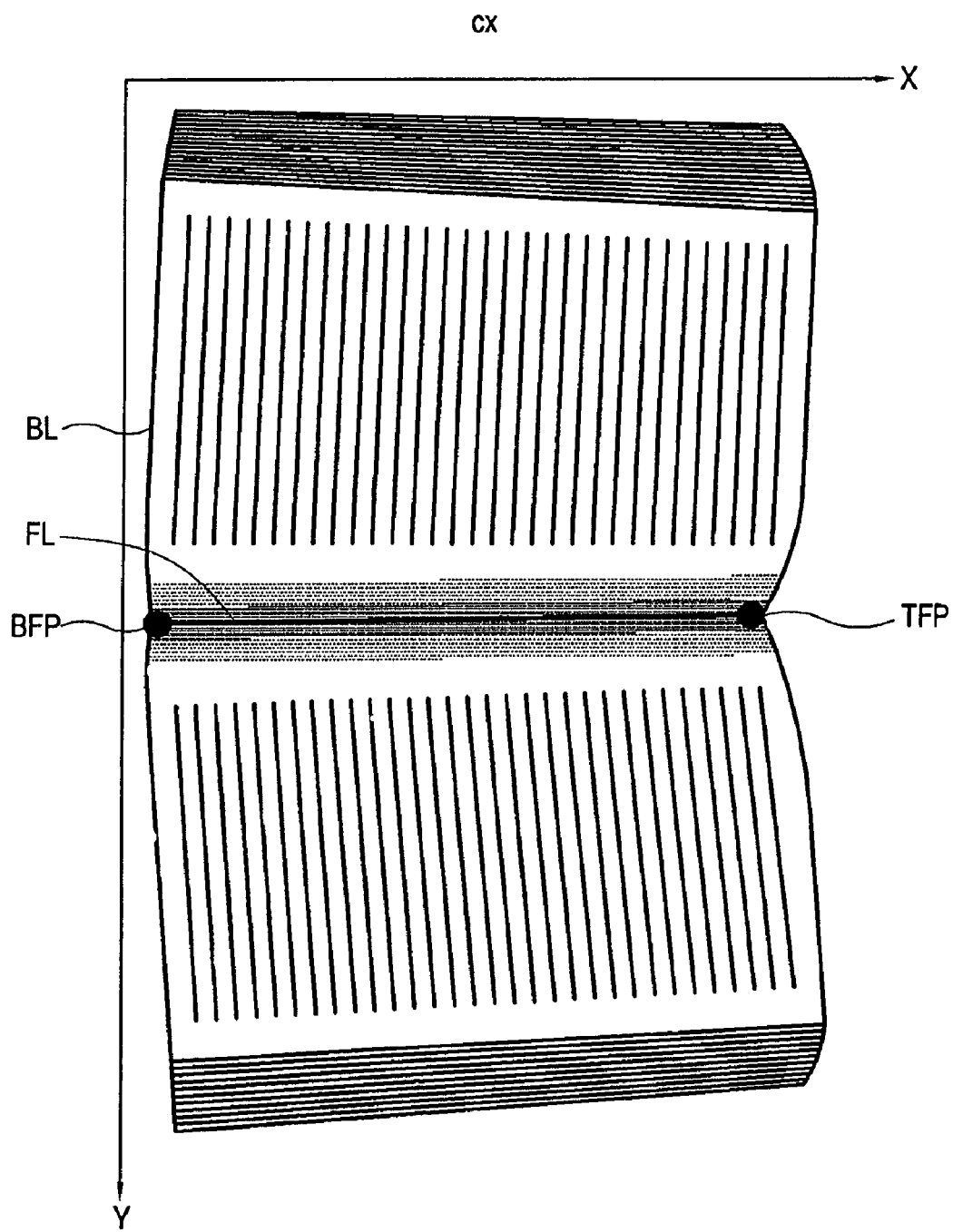
FIGS. 4A to 4D are diagrams to explain a boundary line determining process of the boundary line determining part.
Figure 4B:
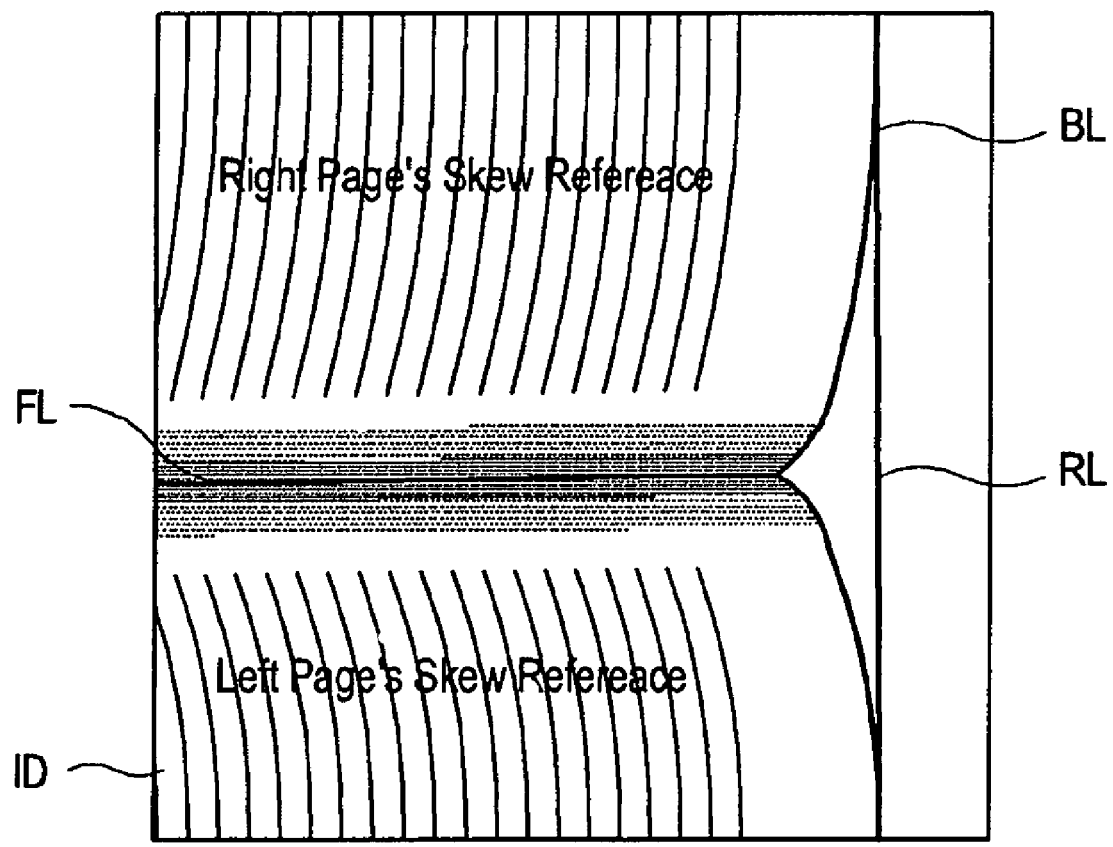

As used herein, a boundary line is one of a set of line segments that separates a document region in the image from the surrounding region that forms an image of the empty stage glass 200 beyond the depth of field of the scanning head 300, which is referred to as the "stage glass region." Referring to FIG. 4a, the boundary line detecting part 510 detects the boundary line (BL) separating the document region from the stage glass region in the original image data. The boundary line detecting part 510 may obtain coordinates of corners of a minimal quadrilateral region that includes the document using the coordinate system defined on the original image data stored in the storing part 400, such as is described above.

A folding line (FL), as used herein, is a line in the region of the image that is defocused, e.g., where the document is furthest from the stage glass 200. In instances where the document is a book, as illustrated in 4A, the folding line (FL) is located where the pages are bound together. As indicated above, the folding line (FL) region in which the folding line (FL) resides, is a varyingly resolvable region of the image, and may include portions that are irresolvable. The exemplary folding line detecting part 520 detects the folding line (FL) in the original image data. As illustrated in FIG. 4A, the folding line (FL) my be represented by a straight line that interconnects a top folding point TFP and a bottom folding point BFP. Here, each folding point may be determined as a point on an edge in the image oriented along the Y-axis direction and located on a page a distance from another edge in the Y-axis direction that exceeds 90% of the horizontal length of one page of the book. Alternatively, the upper folding point TFP and the lower folding point BFP may be determined as being at positions at which a calculated slope of the boundary line (BL) changes sign. Other techniques to locate a point at which pages of the document form a folding region, or similar formation, may be used with the present general inventive concept without deviating from the spirit and intended scope thereof.

The boundary line (BL) may be composed of a plurality of line segments, each of which is referred to as a "partial line." A straight partial line may be referred to as a "skew line" when constituting the boundary line (BL), and a degree of skew of pages in the left and right sides of the folding line (FL) may be calculated therewith. The boundary line (BL) will generally enclose a complex shape defining the document region therein. The shape of the document region may thus be represented by a plurality of points interconnected by partial lines. The points at which partial lines meet to form the boundary line (BL) at a portion thereof having a small curvature may be expressed by one straight line and a portion having a large curvature may be expressed by a plurality of straight lines. A straight line may be formed to extend across the folding line (FL) region to join together partial lines on either side thereof that define straight portions, or portions of low curvature. The line joining the low curvature portions of the boundary line (BL) across the folding line (FL) region is defined as a reference line (RL). Each of the partial lines of the boundary line (BL) that deviate from the reference line (RL) form an angle with respect to the reference line (RL), which is an indication of an amount of skew in the vicinity of that partial line. The exemplary skew line detecting part 530 detects the skew lines in the original image data.

The correction region setting part 540 may establish four correction regions in the original image data around the folding line (FL) and a CX axis, as illustrated in FIG. 4A. The CX axis may be at a known position, such as at a center line of the stage glass 200. The original document image data may be separated into a right top (RT) region, a right bottom (RB) region, a left top (LT) region and a left bottom (LB) region, as demarked by the folding line (FL) and the CX axis. In certain embodiments of the present general inventive concept, the setting and number of correction regions depend on whether the folding line (FP) is detected, where the absence of such detection may indicate that no skew correction is necessary. For example, if the top folding point (TFP) is detected, the right top region (RT) and the left top region (LT) may be set as the correction regions, in that those regions would be influenced by the folding line (FL) region. Similarly, if the bottom folding point (BFP) is detected, the right bottom region (RB) and the left bottom region (LB) may be set as the correction regions. In addition, if both of the top folding point (TFP) and the bottom folding point (BFP) are detected, all of the four regions may be set as the correction regions.

Figure 4C:
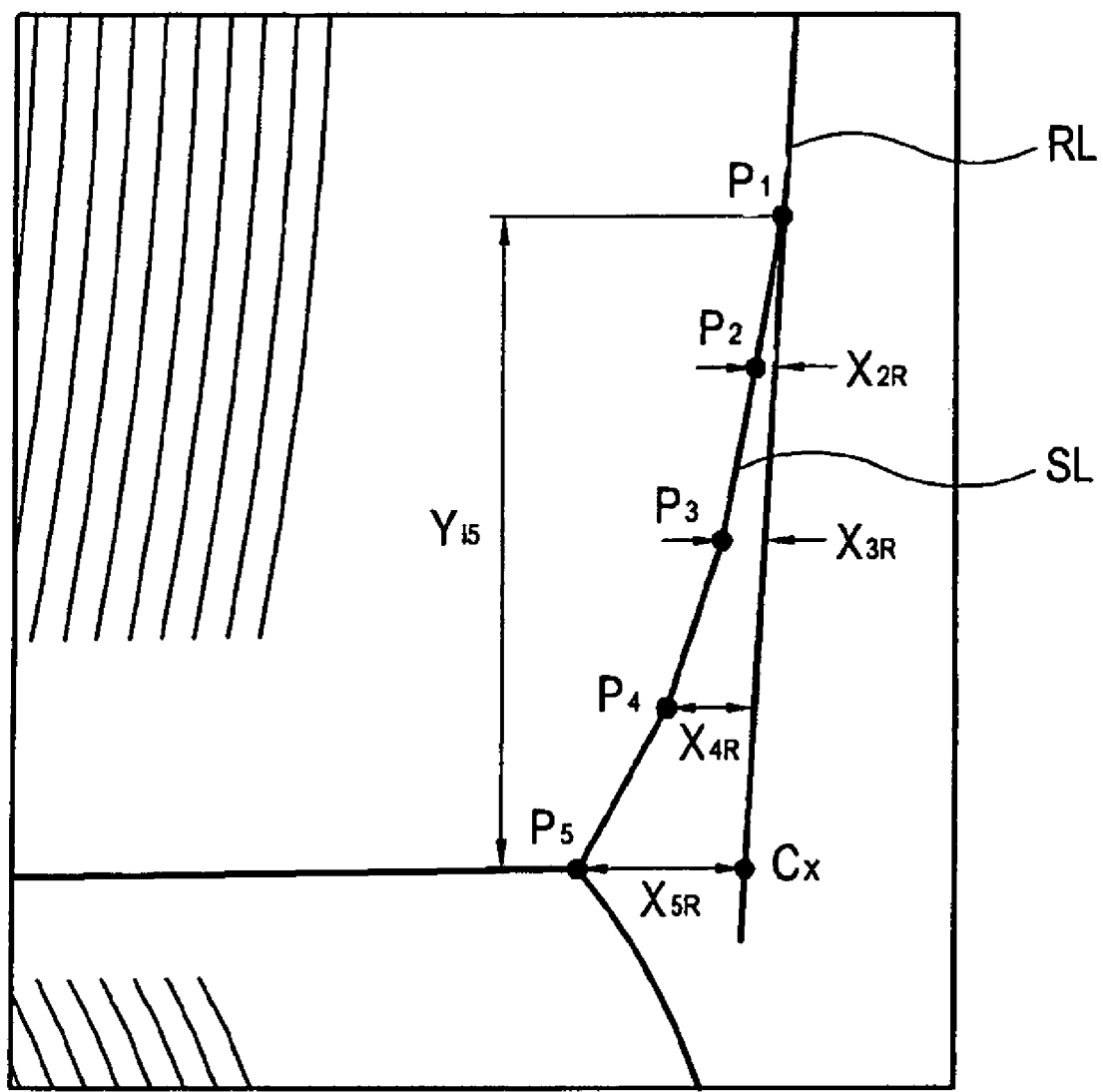

As used herein, a separating line is a series of line segments forming the boundary line (BL) in the folding line (FL) correction region, as illustrated in FIG. 4C. Since the folding line (FL) correction region is farther separated from the stage glass 200 than other regions of the document, the scanning head 300 is defocused in this folding line (FL) correction region, and accordingly, the original image in the folding line (FL) correction region is varyingly resolvable and portions thereof may appear to be dark. Accordingly, it is difficult to detect the boundary line (BL) of the image in the folding line (FL) correction region. The separating line setting part 550 determines a separating line (SL) that separates the stage glass region from the document image region in the folding line (FL) correction region using, for example, the coordinate values of the predetermined reference line (RL) and the folding line (FL).

Figure 4D:
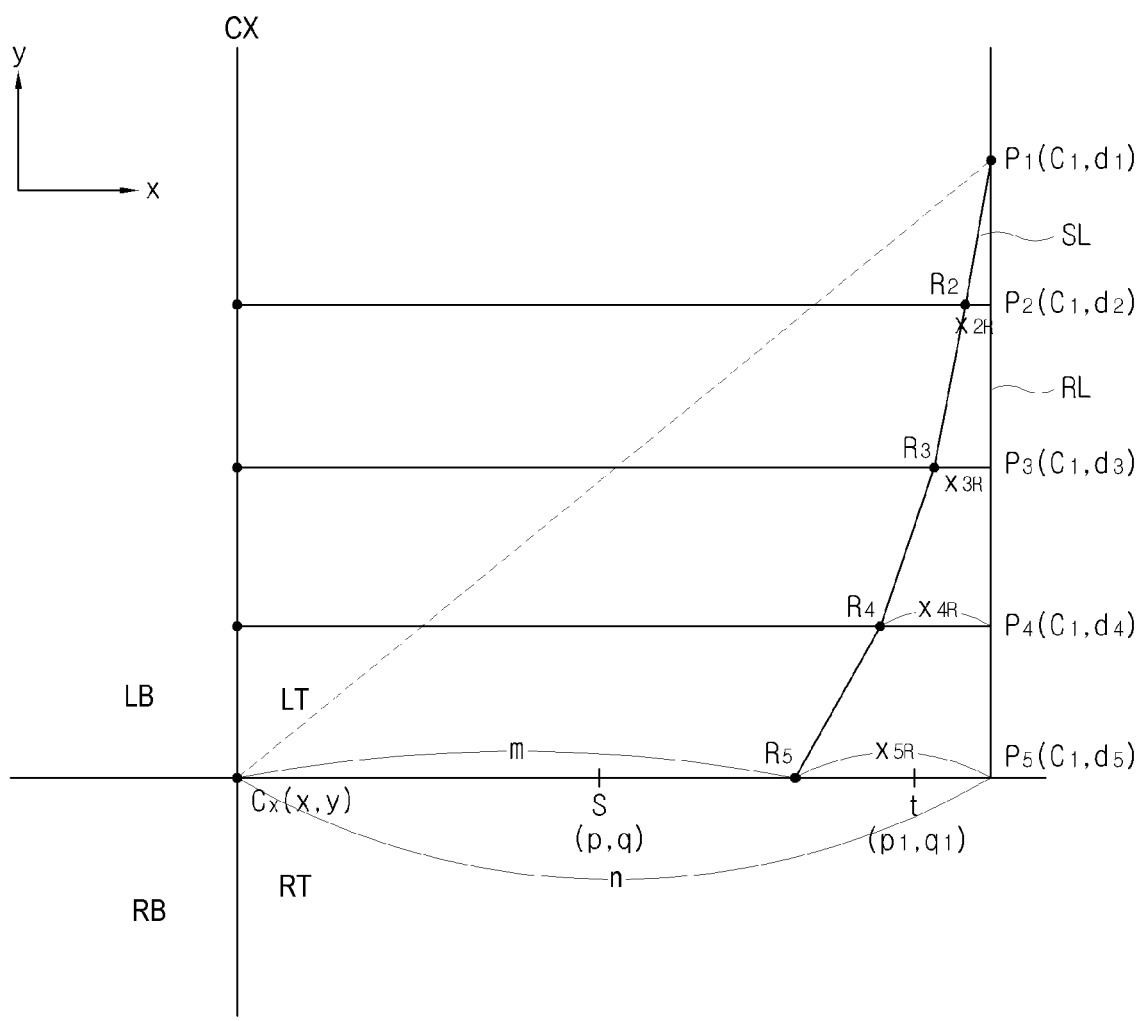

Referring to FIG. 4D, in certain embodiments of the present general inventive concept, the separating line setting part 550 sets a point at which the reference line (RL) meets the boundary line (BL) as point $P_1$ and sets the top folding point (TFP) to be point $P_5$. Then, the separating line setting part 550 determines a Y axis direction distance $Y_{15}$ between the points $P_1$ and $P_5$ based on coordinate values of $P_1$ and $P_5$. The distance may be calculated in terms of, for example, a number of scan lines and a number of pixels as determined from corresponding locations in the storing part 400, e.g., the coordinate values of the points $P_1$ and $P_5$ are determined by the controller 900 based on the image data stored in the corresponding scan line unit of pixels in the storing part 400.

The separating line setting part 550 may calculate an X axis direction distance $X_{5R}$ between the point $R_5$ and the reference line (RL). Then, the separating line setting part 550 may obtain coordinate values of points $P_2$ to $P_4$ using, for example, an interpolation method based on an area ratio of a triangle defined by the three angular points $P_5$, $P_1$ and $R_5$ to each of inscribed triangles. For example, the triangle illustrated in FIG. 4D defined by the three angular points $P_1$, $R_4$ and $P_4$ has an area that is a fraction of the area of the triangle defined by the points $P_1$, $R_5$, and $P_5$. The distance $X_{4R}$ between the point $R_4$ and the point $P_4$, for example, may be calculated by multiplying the distance between the point $P_5$ and the point $R_5$ by a predetermined weighting value. Thus, once the coordinate values of the points $P_1$ to $P_5$ are determined, a distance $X_{2R}$ between the point $R_2$ and the point $P_2$ and a distance $X_{3R}$ between the point $R_3$ and the point $P_3$ may be obtained in the same way.

When the separating line (SL) in the corresponding correction region is set by the boundary line determining part 500 as described above, the correction factor calculating part 600 calculates a correction factor (CF) to correct the coordinate values in the original image so that the points on the separating line (SL) are mapped onto the points on the reference line (RL).

It is to be understood that the illustration of FIG. 3 is in no way intended to imply an order of operations between the functional components of the boundary line determining part 500 illustrated in FIG. 3. The operations assigned to components of the exemplary embodiment illustrated in FIG. 3 may be performed in any order as needed to obtain information required by another of the exemplary components. Certain operations need not be performed in certain instances and implementations of the present general inventive concept will include handling of those instances. For example, if the folding line (FL) region of a particular image includes no irresolvable data and the boundary therein may be located without the image processing of the separating line setting part 550, embodiments of the present general inventive concept will direct the system to bypass the component and its concomitant operations.

Referring once again to FIG. 4D, the correction factor (CF) may be determined by a ratio of a distance between the CX axis and the points on the separating line (SL) to a distance between the CX axis and the reference line (RL). That is, the correction factor (CF) may be obtained by a ratio of the area of a triangle defined by the three angular points $P_1$, $C_x$ and $P_5$ to the area of a triangle defined by the three angular points $P_1$, $R_5$ and $P_5$. As one example, in a line including the point $P_5$, the correction factor (CF) is determined a ratio of a distance m between the CX axis to the point $R_5$ on the separating line (SL) to a distance n between the CX axis and the point $P_5$ on the reference line (RL). Thus, the correction factor (CF) corresponding to each line is obtained according to the following generalized equation 1.

$$k=m/n. \qquad \text{<Equation 1>}$$

In equation 1, k represents the correction factor (CF).

When the separating line (SL) is mapped onto the reference line (RL), an arbitrary point s having coordinate value (p, q) inside the separating line (SL) is mapped to a point t of a coordinate value $(p_1, q_1)$ by the following equation 2.

$$(p_1,q_1)=(p,q \times k) \qquad \text{<Equation 2>}$$

Equation 2 is a transformation to map the arbitrary point s of coordinate value (p, q) inside of the separating line (SL) into the mapped point t represented by the coordinate value $(p_1, q_1)$. Inverting the equation 2, the original position s (p, q) before mapping can be obtained from the mapped point t having coordinate value $(p_1, q_1)$. In this case, the correction factor (CF) k may be expressed by the following equation 3.

$$k=n/m. \qquad \text{<Equation 3>}$$

The original coordinate (p, q) value of the point s mapped to the point t having coordinate value $(p_1, q_1)$ may be obtained by the following equation 4.

$$(p,q)=(p_1,q_1/k) \qquad \text{<Equation 4>}$$

Since the correction factor (CF) has different values assigned to different lines in the image, the above equation 4 may be modified to apply to each of the different lines.

Additionally, an amount of skew varies by correction region, as observed in FIG. 4A, and, accordingly, the above equation 4 may be modified to apply to other correction regions UR, LR and LL depending on the relationship between the data in each correction region and the CX axis.

When a calculation of the correction factor (CF) corresponding to each portion of the correction region is obtained, the correction factor calculating part 600 informs the controller 900 of the transformation information to map the image data in accordance with the corresponding correction factor (CF).

Figure 5:
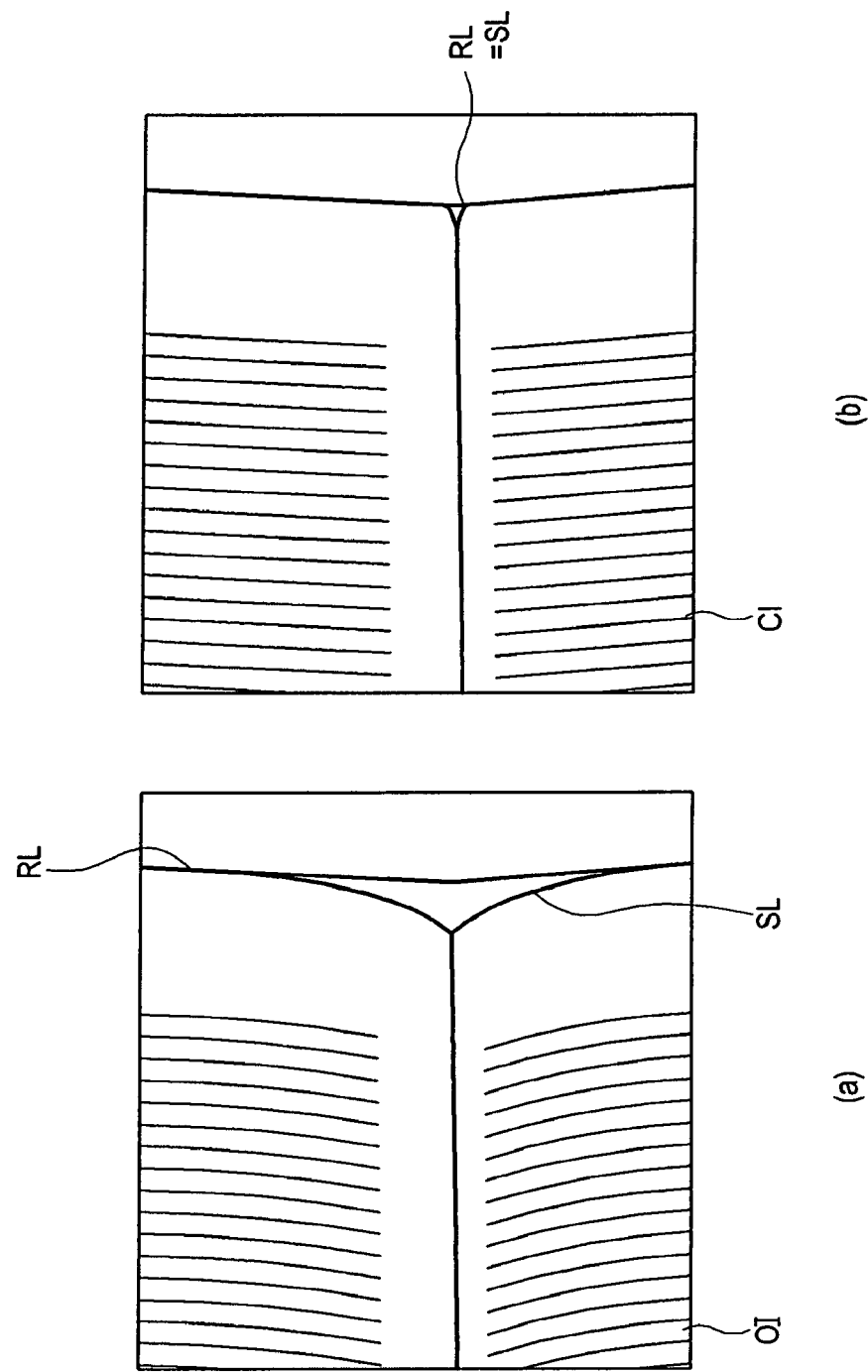
FIG. 5 is an image illustrating a result of correction on an image by the scanning apparatus according to the exemplary embodiment of the general inventive concept.
Figure 6:
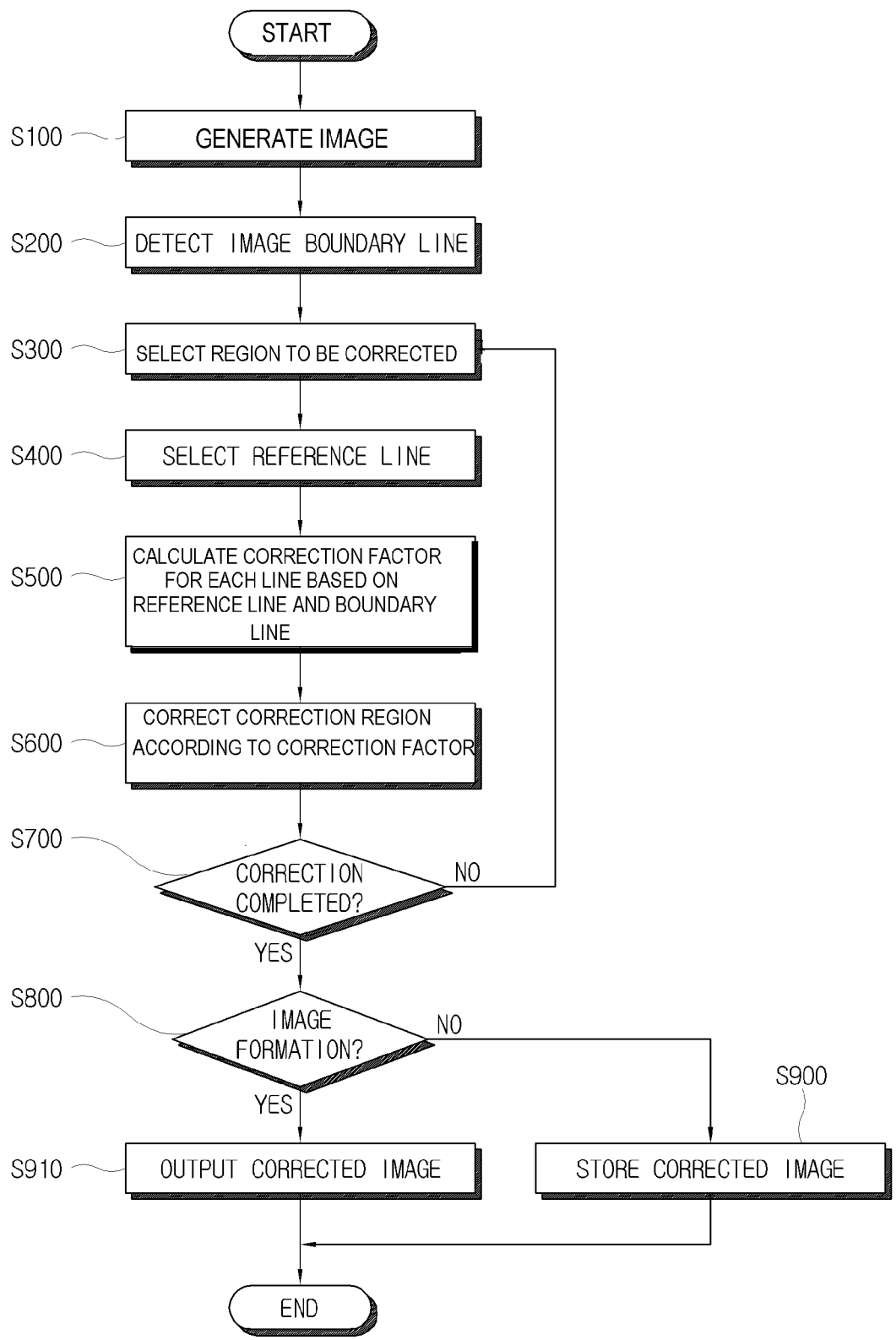
FIG. 6 is a flow chart illustrating image processing of the scanning apparatus according to the exemplary embodiment of the general inventive concept.

The exemplary image processing part 700 maps the separating line (SL) onto the reference line (RL) using the correction factor (CF) calculated in the correction factor calculating part 600 and corrects the image data inside of the separating line (SL) to be appropriately placed, in accordance with the correction factor (CF), to the inside of reference line (RL) to produce thereby a corrected image (CI). Since the separating line (SL) moves to the reference line linearly by correction of the image processing part 700, as illustrated in FIG. 5, an original image (OI) having skews in its folding line (FL) region can be corrected into the corrected image (CI). The image processing part 700 may additionally correct brightness and resolution of the corrected image (CI) according to appropriate directives input by a user.

The image forming part 800 renders the corrected image (CI) corrected by the image processing part 700 so that the corrected image may be printed on a page of paper or displayed on a display device. The rendering of the corrected image may be performed according to a control signal from the controller 900 generated from information on the correction factors (CF). The image forming part 800 may use an inkjet method, an electrophotography method, a thermal transfer printing method, etc. depending on a method in which an image is printed on a paper. The inkjet method is a method of printing the corrected image on a paper when an ink cartridge jets ink drops on the paper while reciprocating in a horizontal direction of the paper. The electrophotography method is a method of selectively applying developer on a paper using a potential difference among the developer, a photoconductor and a transfer roller. The thermal transfer printing method is a method of transferring ink onto a paper by heating and pressurizing an ink ribbon coated with ink on a paper. The image forming part 800 may be implemented as a conventional image forming part, and detailed explanation thereof will be omitted to the sake of brevity.

The exemplary controller 900 controls the boundary line detecting part 510 to detect the boundary line (BL) of the original image produced by the scanning head 300. When the boundary line detecting part 510 informs the controller 900 that the boundary line (BL) has a skew region, the controller 900 controls the boundary line determining part 500 and the image processing part 700 to correct the skew region of the original image.

Specifically, the exemplary controller 900 calculates a coordinate value of the original image stored in the storing part 400, informs the boundary line determining part 500 of the calculated coordinate value, informs the image processing part 700 of the correction factor (CF) received from the correction factor calculating part 600, and controls the image processing part 700 to correct the original image to be the corrected image. In addition, the controller 900 controls the image forming part 800 to output the corrected image or to store the corrected image in the storing part 400 according to a selection by a user. The controller 900 may further receive user directives from the user via the input part 100, and control the features of the scanning apparatus 1 accordingly.

An image processing method according to the exemplary embodiment of the general inventive concept will now be described with reference to FIGS. 2 to 6.

First, a user positions a document onto the stage glass 200 and activates a scanning signal. The scanning head 300 then scans the document to produce an original image while translating below the stage glass 200 at operation S100. The boundary line detecting part 510 detects a boundary line (BL) of the produced original image at operation S200. If it is detected that the boundary line (BL) defines a skew region, the controller 900 controls the boundary line determining part 500 to determine the separating line (SL) of a correction region. Accordingly, the boundary line determining part 500 first determines a reference line (RL) at operation S400, and calculates a correction factor by specifying which points on the boundary line (BL) are mapped onto points on the reference line (RL), based on knowledge of the locations of the boundary line (BL) and the reference line (RL), at operation S500.

The controller 900 controls the image processing part 700 to correct lines of the original image according to the calculated correction factor and calculation equation at operation S600. If there is a plurality of correction regions, remaining correction regions are corrected according to the above-described process at operation S700. When the user applies an output signal to output the corrected image, the controller 900 controls the image forming part 800 to print the corrected image on a paper at operation S910. Otherwise, the controller 900 stores the corrected image in the storing part 400.

As described above, it can be seen that the original image having the skew image as illustrated in FIG. 5A is corrected so that the separating line (SL) concurs with the reference line (RL) by the scanning apparatus 1 of the general inventive concept, as illustrated in FIG. 5B.

Although it has been illustrated in the exemplary embodiment that the scanning apparatus 1 includes only the image forming part 800, the scanning apparatus 1 may further include a facsimile machine that transmits the corrected image to an external facsimile machine, an e-mail transmitting part that transmits the corrected image by e-mail through a network, etc.

Certain embodiments of the present general inventive concept provide for the functional components to manufactured, transported, marketed and/or sold as processor instructions encoded on computer-readable media. The present general inventive concept, when so embodied, can be practiced regardless of the processing platform on which the processor instructions are executed and regardless of the manner by which the processor instructions are encoded on the medium.

It is to be understood that the computer-readable medium may be any medium on which the instructions may be encoded and then subsequently retrieved, decoded and executed by a processor, including electrical, magnetic and optical storage devices, and wired, wireless, optical and acoustical communication channels. The computer readable medium may include either or both of persistent storage, referred to herein as "computer-readable recording media" and as spatiotemporal storage, referred to herein as "computer-readable transmission media". Examples of computer-readable recording media include, but not limited to, read-only memory (ROM), random-access memory (RAM), and other electrical storage; CD-ROM, DVD, and other optical storage; and magnetic tape, floppy disks, hard disks and other magnetic storage. The computer-readable recording media may be distributed across components, to include such distribution through storage systems interconnected through a communication network. The computer-readable transmission media may transmit encoded instructions on electromagnetic carrier waves or signals, or as acoustic signals through acoustically transmissive media. Moreover, the processor instructions may be derived from algorithmic constructions of the present general inventive concept in various programming languages, the mere contemplation of which illustrates the numerous realizable abstractions of the present general inventive concept.

As apparent from the above description, the present general inventive concept provides a scanning apparatus which is capable of detecting a skew region in original image data produced by a scanning head and correcting the skew region using coordinate values of a boundary line of the original image.

Accordingly, since the skew region can be corrected by using the original image data without knowledge of a focus distance between the scanning head and a stage glass, the general inventive concept can be generally applied to scanning apparatuses having different focus distances.

In addition, since the skew region can be automatically corrected, the user's convenience is improved.

Although a few exemplary embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A scanning apparatus comprising:
    a stage glass on which a document is positioned;
    a scanning head that scans an image of the document while translating below the stage glass;
    an image processing part that processes image data produced by the scanning head;
    a boundary line detecting part that detects a boundary line of the image; and
    a controller that, if a skew line in the boundary line is detected by the boundary line detecting part, compares the skew line with a predetermined reference line indicated by a straight line in the boundary line, and controls the image processing part to correct the skew line and the image data inside of the boundary line based on a ratio of a distance between a predetermined axis and points on a first boundary line including the skew line to a distance between the predetermined axis and the reference line using a result of the comparison, where the predetermined axis is orthogonal to a folding line which is a line in a region of the image that is defocused and is furthest from the stage glass,
    wherein the controller corrects the skew line occurring in an image of the boundary line when the scanning head scans a book.

2. The scanning apparatus according to claim 1, wherein the boundary line detecting part sets the reference line based on a straight line portion of the boundary line.

3. The scanning apparatus according to claim 2, wherein the controller calculates a coordinate value of the image of the document and a coordinate value of an image of the stage glass and controls the image processing part to map a coordinate of the skew line onto a coordinate of the reference line.

4. The scanning apparatus according to claim 3, further comprising a correction factor calculating part to calculate a correction factor which is determined by the ratio of the distance between the predetermined axis and the points on the first boundary line including the skew line to the distance between the predetermined axis and the reference line.

5. The scanning apparatus according to claim 4, further comprising:
    an image forming part that outputs the image,
    wherein the controller controls the image forming part to output the image processed by the image processing part.

6. The scanning apparatus according to claim 1, further comprising:
    an image forming part that outputs the image,
    wherein the controller controls the image forming part to output the image processed by the image processing part.

7. An image processing method of a scanning apparatus comprising a stage glass on which a document is positioned and a scanning head that scans an image of the document while translating below the stage glass, comprising:
    detecting a boundary line of the image;
    calculating a coordinate value of the boundary line and detecting a skew line whose coordinate value is not calculated;
    comparing the skew line with a reference line indicated by a straight line in the boundary line; and correcting the image and the skew line based on a ratio of a distance between a predetermined axis and points on a first boundary line including the skew line to a distance between the predetermined axis and the reference line using a result of the comparison, where the predetermined axis is orthogonal to a folding line which is a line in a region of the image that is defocused and is furthest from the stage glass, wherein the correcting the image and the skew line comprises correcting the skew line occurring in an image of the boundary line when the scanning head scans a book.

8. The image processing method according to claim 7, further comprising:

encoding computer instructions onto a computer-readable medium that, when decoded and executed by a processor, perform the detecting of the boundary line, the calculating of the coordinate value of the boundary line and the detecting of the skew line, the comparing of the skew line with the reference line, and the correcting of the image and the skew line.

9. An image forming method, comprising:

providing image data including a completely resolvable region thereof and a varyingly resolvable region thereof;

extrapolating a linear relationship in the image data of the completely resolvable region across the varyingly resolvable region; and mapping the image data in the varyingly resolvable region to be aligned in a corrected image by the linear relationship, wherein the mapping the image data comprises correcting the image data based on a ratio of a distance between a predetermined axis and points on a first boundary line including the skew line to a distance between the predetermined axis and the reference line using a result of the comparison and correcting the varyingly resolvable region occurring in an image of a boundary line when a book is scanned, wherein the predetermined axis is orthogonal to a folding line which is a line in a region of the image that is defocused and is furthest from a scanning plane.

10. The image forming method according to claim 9, wherein the extrapolating of the linear relationship includes locating a boundary of the completely resolvable region at locations thereof on opposing sides of the varyingly resolvable region and extrapolating the boundary across the varyingly resolvable region.

11. The image forming method according to claim 10, wherein the mapping of the image data comprises:

locating a boundary of the varyingly resolvable region; and determining a difference in respective locations of the boundary in the completely resolvable region and the boundary in the varyingly resolvable region.

12. The image forming method according to claim 11, wherein the determining the difference in respective locations of the boundary in the completely resolvable region and the boundary in the varyingly resolvable region comprises:

specifying a location of each of a plurality of image data points on the boundary of the varyingly resolvable region;

determining respective locations of a plurality of image data points on the boundary of the completely resolvable region in linear opposition to the respective locations of the plurality of image data points on the boundary of the varyingly resolvable region; and determining a difference in respective locations of the image data points on the boundary of the varyingly resolvable region and the image data points on the boundary of the completely resolvable region.

13. The image forming method according to claim 12, wherein the specifying of the location of the image data points on the boundary of the varyingly resolvable region comprises:

locating a data point in the varyingly resolvable region at which the boundary thereof is maximally remote from the extrapolated boundary of the completely resolvable region; and interpolating the locations the plurality of image data points on the boundary of the varyingly resolvable region to be in piecewise linear relationship respective one with another along the boundary of the varyingly resolvable region.

14. The image forming method according to claim 13, wherein the interpolating of the locations the plurality of image data points on the boundary of the varyingly resolvable region comprises:

weighting a difference in respective locations of an unknown image data point on the boundary of the varyingly resolvable region and the image data point on the boundary of the completely resolvable region by a factor determined by respective locations of a known image data point on the boundary of the varyingly resolvable region and the image data point on the boundary of the completely resolvable region.

15. The image forming method according to claim 14, wherein the weighting comprises:

calculating an area of a triangle including respective locations of the known image data point on the boundary of the varyingly resolvable region and the image data point on the boundary of the completely resolvable region;

multiplying the area by a predetermined area weighting factor;

determining a length of a side of a triangle having the weighted area and including the image data point on the boundary of the completely resolvable region and an image data point on the extrapolated boundary in the varyingly resolvable region removed a predetermined amount from the image data point on the boundary of the completely resolvable region; and calculating the location of the unknown data point as the determined length of the side of the triangle from the extrapolated boundary in the varyingly resolvable region.

16. The image forming method according to claim 12, wherein the mapping of the image data comprises:

scaling the respective locations of the image data aligned with the image data points on the boundary of the varyingly resolvable region by an amount corresponding to a difference in the respective locations of the image data points on the boundary of the varyingly resolvable region and the image data points on the boundary of the completely resolvable region; and storing the image data aligned with the image data points on the boundary of the varyingly resolvable region at a location in a memory of the corrected image corresponding to the scaled respective locations of the image data.

17. A non-transitory computer-readable medium having encoded thereon computer instructions that, when decoded and executed by a processor, performs:

receiving image data including a completely resolvable region thereof and a varyingly resolvable region thereof;

extrapolating a linear relationship in the image data of the completely resolvable region across the varyingly resolvable region; and mapping the image data in the varyingly resolvable region to be aligned in a corrected image by the linear relationship, wherein the mapping the image data comprises correcting the image data based on a ratio of a distance between a predetermined axis and points on a first boundary line including the skew line to a distance between the predetermined axis and the reference line using a result of the comparison and correcting the varyingly resolvable region occurring in an image of a boundary line when a book is scanned, wherein the predetermined axis is orthogonal to a folding line which is a line in a region of the image that is defocused and is furthest from a stage glass.

18. An image forming apparatus, comprising:
a scanning head having a predefined optical depth of field with respect to a scanning plane to obtain image data of a document at least partially coplanar with the scanning plane;
a controller to control the scanning head to translate across the scanning plane to acquire an original image of the document; and
an image processing part to relocate skewed image data in the original image acquired from a portion of the document at least partially removed from the scanning plane while within the depth of field to a new location in a corrected image, the new location aligning the skewed image data with corresponding focused data of the original image data acquired from the portion of the document coplanar with the scanning plane,
wherein the image processing part corrects the skewed image of a boundary line when the scanning head scans a book and relocates the skewed image data based on a ratio of a distance between a predetermined axis and a location of a boundary of the skewed image data to a distance between the predetermined axis and a location of a reference boundary indicated by a straight line in the boundary, wherein the predetermined axis is orthogonal to a folding line which is a line in a region of the image that is defocused and is furthest from the scanning plane.

19. The image forming apparatus according to claim 18, further comprising:
a correction factor calculating part to determine a correction factor that scales respective locations of the skewed data to the new location, the correction factor determined by the ratio of the distance between of the predetermined axis and the location of the boundary of the skewed image data to the distance between the predetermined axis and the location of the reference line.

20. The image forming apparatus according to claim 19, further comprising:
a boundary line determining part to determine the location of the boundary of the focused data and to extrapolate the boundary of the focused data across the skewed data as the reference boundary.

21. The image forming apparatus according to claim 20, wherein the boundary line determining part comprises:
a boundary line detecting part to detect the boundary of the focused data.

22. The image forming apparatus according to claim 20, wherein the boundary line determining part comprises:
a folding line detecting part to detect folding points in the skewed data corresponding to points at which the document is furthest removed from the scanning plane.

23. The image forming apparatus according to claim 22, wherein the folding line detecting part determines the folding points as being a predetermined distance from an opposite boundary of the focused data.

24. The image forming apparatus according to claim 23, wherein the predetermined distance is 90% of a horizontal distance from the opposite boundary of the focused data.

25. The image forming apparatus according to claim 22, wherein the folding line detecting part determines the folding points as being at locations on the boundary of the skewed data where the slope thereof changes sign.

26. The image forming apparatus according to claim 22, further comprising:
a correction region setting part to determine a region in the skewed data by a location of the folding points.

27. The image forming apparatus according to claim 19, wherein the boundary line determining part comprises:
a skew line detecting part to determine a degree of skew in partial lines forming the boundary of the skewed data with respect to the reference boundary therein.

28. The image forming apparatus according to claim 19, wherein the boundary line determining part comprises:
a separating line setting part to determine the boundary in an irresolvable portion of the skewed data.

29. The image forming apparatus according to claim 19, wherein the separate line setting part determines the boundary in the irresolvable portion by interpolation of data therein previously determined by interpolation.

30. The image forming apparatus according to claim 29, wherein the interpolation includes determining a point on a base of a triangle having a weighted area of a triangle computed from the data previously determined by interpolation.

31. An image processor, comprising:
a storage part to store an original image of a document at least partially coplanar with a plane defining an optical depth of field; and
an image processing part to relocate skewed image data in the original image acquired from a portion of the document at least partially removed from the plane while within the depth of field to a new location in a corrected image, the new location aligning the skewed image data with corresponding focused data of the original image data acquired from the portion of the document coplanar with the scanning plane as determined by a location of a reference boundary indicated by a straight line in of a boundary of the focused data relative to a location of a boundary of the skewed data,
wherein the image processing part corrects the skewed image data occurring in a boundary line when a book is scanned and relocates the skewed image data based on a ratio of a distance between a predetermined axis and a location of a boundary of the skewed image data to a distance between the predetermined axis and a location of a reference boundary indicated by a straight line in the boundary, where the predetermined axis is orthogonal to a folding line which is a line in a region of the image that is defocused and is furthest from the scanning plane.

32. An image forming apparatus, comprising:
a controller to receive a scanned document image; and
a unit to determine a boundary and a folding line from the scanned document image, to determine a correction region of the scanned document image with respect to a center line and the folding line, and to correct a boundary line of the correction region of the scanned document image according to a ratio of a distance of points on a first boundary line including a skew line in the boundary from a predetermined axis to a distance off a reference line indicated by a straight line in the boundary from the predetermined axis, where the predetermined axis is orthogonal to the folding line, wherein the unit corrects the skew occurring in the boundary line when a book is scanned.

33. A method of forming an image with an image forming apparatus including a scanner, the method comprising:

receiving an image with the image forming apparatus that is scanned by the scanner; an detecting a boundary line of the scanned image with a detector of the image forming apparatus; and when a skew line in the boundary line is detected, comparing the skew line with a predetermined reference line and correcting the skew line and the image data inside of the boundary line based on a ratio of a distance between a predetermined axis and points on a first boundary line including the skew line to a distance between the predetermined axis and the reference line using a result of the comparison with a controller of the image forming apparatus, where the predetermined axis is orthogonal to a folding line which is a line in a region of the image that is defocused and is furthest from the scanning plane, wherein the correcting the skew line comprises correcting the skew line occurring in an image of the boundary line when the scanner scans a book.

34. A method of forming an image with an image forming apparatus including a scanner, the method comprising:

receiving a scanned document image with a controller of the image forming apparatus from the scanner;

determining a boundary and a folding line from the scanned document image with the controller;

determining a correction region of the scanned document image with respect to a center line and the folding line with the controller; and correcting a boundary line of the correction region of the scanned document image according to a ratio of a distance between a predetermined axis and points on a first boundary line including a skew to a distance between the predetermined axis and the reference line indicated by a straight line in the boundary line with the controller, where the predetermined axis is orthogonal to the folding line, wherein the correcting the boundary line comprises correcting the skew occurring in an image of the boundary line when the scanner scans a book.

* * * * *